United States Patent
Hegyi

(10) Patent No.: US 10,983,338 B2
(45) Date of Patent: Apr. 20, 2021

(54) EXIT-PUPIL EXPANDER USED DISTRIBUTE LIGHT OVER A LIQUID-CRYSTAL VARIABLE RETARDER

(71) Applicant: Palo Alto Research Center Incorporated, Palo Alto, CA (US)

(72) Inventor: Alex Hegyi, San Francisco, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 259 days.

(21) Appl. No.: 15/858,368

(22) Filed: Dec. 29, 2017

(65) Prior Publication Data

US 2019/0204594 A1 Jul. 4, 2019

(51) Int. Cl.

| | | |
|---|---|---|
| G02B 27/00 | (2006.01) |
| G02F 1/1335 | (2006.01) |
| G02F 1/139 | (2006.01) |
| G01J 3/45 | (2006.01) |
| G01J 3/453 | (2006.01) |
| G02B 27/42 | (2006.01) |
| G02F 1/13357 | (2006.01) |
| F21V 8/00 | (2006.01) |
| G01J 3/447 | (2006.01) |

(52) U.S. Cl.
CPC .......... *G02B 27/0081* (2013.01); *G01J 3/447* (2013.01); *G01J 3/45* (2013.01); *G01J 3/4531* (2013.01); *G02B 6/0033* (2013.01); *G02B 27/4272* (2013.01); *G02F 1/1395* (2013.01); *G02F 1/133528* (2013.01); *G02F 1/133615* (2013.01); *G02F 2201/302* (2013.01)

(58) Field of Classification Search
None
See application file for complete search history.

(56) References Cited

U.S. PATENT DOCUMENTS

| | | |
|---|---|---|
| 4,342,516 A | 8/1982 | Chamran et al. |
| 4,461,543 A | 7/1984 | Mcmahon |
| 4,812,657 A | 3/1989 | Minekane |
| 4,848,877 A | 7/1989 | Miller |
| 4,905,169 A | 2/1990 | Buican et al. |
| 5,126,869 A | 6/1992 | Lipchak et al. |
| 5,247,378 A | 9/1993 | Miller |
| 5,347,382 A | 9/1994 | Rumbaugh |
| 5,592,314 A | 1/1997 | Ogasawara et al. |
| 5,619,266 A | 4/1997 | Tornita et al. |
| 5,642,214 A | 6/1997 | Ishii |
| 5,784,162 A | 7/1998 | Cabib et al. |
| 5,856,842 A | 1/1999 | Tedesco |

(Continued)

OTHER PUBLICATIONS

File History for U.S. Appl. No. 14/527,347, 504 pages.

(Continued)

*Primary Examiner* — Richard H Kim

(74) *Attorney, Agent, or Firm* — Mueting Raasch Group

(57) ABSTRACT

An optical device includes a liquid-crystal variable retarder. An exit-pupil expander is optically coupled to the liquid-crystal variable retarder, the exit-pupil expander includes: at least one optical input feature that receives reference light from a reference light source; and one or more optical coupling elements coupled to receive the reference light from the reference light source and expand the reference light to one or more spatially-separated regions of the liquid-crystal variable retarder.

19 Claims, 9 Drawing Sheets

(56) References Cited

U.S. PATENT DOCUMENTS

| | | | |
|---|---|---|---|
| 5,953,083 A | 9/1999 | Sharp | |
| 6,169,594 B1 | 1/2001 | Aye et al. | |
| 6,330,097 B1 | 12/2001 | Chen et al. | |
| 6,421,131 B1 | 7/2002 | Miller | |
| 6,552,836 B2 | 4/2003 | Miller | |
| 6,576,886 B1 | 6/2003 | Yao | |
| 6,774,977 B1 | 8/2004 | Walton et al. | |
| 6,992,809 B1 | 1/2006 | Wang et al. | |
| 7,067,795 B1 | 6/2006 | Yan et al. | |
| 7,116,370 B1 | 10/2006 | Huang | |
| 7,167,230 B2 | 1/2007 | Klaus et al. | |
| 7,196,792 B2 | 3/2007 | Drevillon et al. | |
| 7,339,665 B2 | 3/2008 | Imura | |
| 7,630,022 B1 | 12/2009 | Baur et al. | |
| 7,999,933 B2 | 8/2011 | Mcclure | |
| 8,422,119 B1 | 4/2013 | Keaton | |
| 9,631,973 B2 | 4/2017 | Dorschner | |
| 9,864,148 B1 | 1/2018 | Ishikawa | |
| 2002/0181066 A1 | 12/2002 | Miller | |
| 2004/0036876 A1 | 2/2004 | Davis et al. | |
| 2004/0165101 A1 | 8/2004 | Miyanari et al. | |
| 2005/0036143 A1 | 2/2005 | Huang | |
| 2005/0190329 A1 | 9/2005 | Okumura | |
| 2006/0141466 A1 | 6/2006 | Pinet et al. | |
| 2006/0187974 A1 | 8/2006 | Dantus | |
| 2006/0279732 A1 | 12/2006 | Wang | |
| 2007/0003263 A1 | 1/2007 | Nomura | |
| 2007/0030551 A1 | 2/2007 | Oka et al. | |
| 2007/0070260 A1 | 3/2007 | Wang | |
| 2007/0070354 A1 | 3/2007 | Chao et al. | |
| 2008/0158550 A1 | 7/2008 | Arieli et al. | |
| 2008/0212874 A1 | 9/2008 | Steib | |
| 2008/0266564 A1 | 10/2008 | Themelis | |
| 2008/0278593 A1 | 11/2008 | Cho et al. | |
| 2009/0168137 A1 | 7/2009 | Wen et al. | |
| 2009/0284708 A1 | 11/2009 | Abdulhalim | |
| 2010/0056928 A1 | 3/2010 | Zuzak | |
| 2010/0296039 A1 | 11/2010 | Zhao et al. | |
| 2011/0012014 A1 | 1/2011 | Livne et al. | |
| 2011/0170098 A1 | 7/2011 | Normand | |
| 2011/0205539 A1 | 8/2011 | Cattelan et al. | |
| 2011/0273558 A1 | 11/2011 | Subbiah et al. | |
| 2011/0279744 A1 | 11/2011 | Voigt | |
| 2011/0299089 A1 | 12/2011 | Wang et al. | |
| 2012/0013722 A1 | 1/2012 | Wong et al. | |
| 2012/0013922 A1 | 1/2012 | Wong et al. | |
| 2012/0188467 A1 | 7/2012 | Escuti et al. | |
| 2012/0268745 A1 | 10/2012 | Kudenov | |
| 2012/0300143 A1 | 11/2012 | Voigt | |
| 2013/0010017 A1 | 1/2013 | Kobayashi et al. | |
| 2013/0027516 A1 | 1/2013 | Hart | |
| 2013/0107260 A1 | 5/2013 | Nozawa | |
| 2014/0125990 A1 | 5/2014 | Hinderling et al. | |
| 2014/0257113 A1 | 9/2014 | Panasyuk et al. | |
| 2014/0354868 A1 | 12/2014 | Desmarais | |
| 2014/0362331 A1 | 12/2014 | Shi | |
| 2015/0022809 A1 | 1/2015 | Marchant et al. | |
| 2015/0168210 A1 | 6/2015 | Dorschner | |
| 2015/0206912 A1 | 7/2015 | Kanamori | |
| 2016/0123811 A1 | 5/2016 | Hegyi et al. | |
| 2016/0127660 A1 | 5/2016 | Hegyi et al. | |
| 2016/0127661 A1 | 5/2016 | Hegyi et al. | |
| 2016/0231566 A1* | 8/2016 | Levola | G02B 27/0081 |
| 2016/0259128 A1 | 9/2016 | Wagener et al. | |
| 2017/0017104 A1 | 1/2017 | Lin et al. | |
| 2017/0264834 A1 | 9/2017 | Hegyi et al. | |
| 2017/0264835 A1 | 9/2017 | Hegyi et al. | |
| 2017/0363472 A1 | 12/2017 | Abdulhaim | |
| 2017/0366763 A1 | 12/2017 | Lin et al. | |
| 2018/0088381 A1 | 3/2018 | Lin et al. | |
| 2018/0095307 A1 | 4/2018 | Herloski | |
| 2018/0120566 A1* | 5/2018 | Macnamara | G06T 19/006 |
| 2019/0121191 A1 | 4/2019 | Hegyi | |

OTHER PUBLICATIONS

File History for U.S. Appl. No. 14/527,378, 354 pages.
File History for U.S. Appl. No. 14/883,404, 256 pages.
File History for U.S. Appl. No. 15/605,625, 116 pages.
File History for U.S. Appl. No. 15/605,642, 129 pages.
Hegyi et al., "Hyperspectral imaging with a liquid crystal polarization interferometer", Optics Express, vol. 23, No. 22, Oct. 26, 2015, 13 pages.
Jullien et al., "High-resolution hyperspectral imaging with cascaded liquid crystal cells", Optica, Vo. 4, No. 4, Apr. 2017, pp. 400-405.
EP Patent Application No. 18212122.8; European Search Report dated Jun. 26, 2019; 9 pages.
File History for U.S. Appl. No. 15/827,204, 128 pages.
file History for U.S. Appl. No. 15/858,609, 110 pages.
File History for U.S. Appl. No. 14/527,347, 546 pages.
File History for U.S. Appl. No. 14/527,378, 407 pages.
File History for U.S. Appl. No. 14/883,404, 298 pages.
File History for U.S. Appl. No. 15/605,625, 155 pages.
File History for U.S. Appl. No. 15/605,642, 183 pages.
File History for U.S. Appl. No. 15/858,354, 96 pages.
File History for EP App. No. 15190915.7 as retrieved from the European Patent Office electronic filing system on Sep. 25, 2018, 306 pages.
Office action dated Aug. 8, 2018 from CN App. No. 201510710643. X, 16 pages.
U.S. Appl. No. 15/827,204, filed Nov. 30, 2017.
U.S. Appl. No. 15/858,338, filed Dec. 29, 2017.
U.S. Appl. No. 15/858,354, filed Dec. 29, 2017.
U.S. Appl. No. 15/858,609, filed Dec. 29, 2017.
File History for U.S. Appl. No. 14/527,347, 420 pages.
File History for U.S. Appl. No. 14/527,378, 205 pages.
File History for U.S. Appl. No. 14/883,404, 294 pages.
Itoh et al., "Liquid-crystal imaging Fourier-spectrometer array", Optics Letters, 15:11, 652-652, Jun. 1, 1990.
Li et al., "GPU accelerated parallel FFT processing for Fourier transform hyperspectral imaging", Applied Optics, vol. 54, No. 13, pp. D91-D99, May 1, 2015.
Persons et al., "Automated registration of polarimetric imagery using Fourier transform techniques", Proceedings of SPIE, vol. 4819, 2002.
Porter et al., "Correction of Phase Errors in Fourier Spectroscopy", International Journal of Infrared and Millimeter Waves, vol. 4, No. 2, 273-298, 1983.
Smith et al., "Increased acceptance bandwidths in optical frequency conversion by use of multiple walk-off-compensating nonlinear crystals". J. Opt. Soc. Am. B/ vol. 15, No. 1, Jan. 1998.

* cited by examiner

EXIT-PUPIL EXPANDER USED DISTRIBUTE LIGHT OVER A LIQUID-CRYSTAL VARIABLE RETARDER

SUMMARY

The present disclosure is directed to an exit-pupil expander used to expand light over a liquid-crystal variable retarder. In one embodiment an optical device includes a liquid-crystal variable retarder. An exit-pupil expander is optically coupled to the liquid-crystal variable retarder, the exit-pupil expander includes: at least one optical input feature that receives reference light from a reference light source; and one or more optical coupling elements coupled to receive the reference light from the reference light source and expand the reference light to one or more spatially-separated regions of the liquid-crystal variable retarder.

In another embodiment, reference light is coupled into an optical input of an exit-pupil expander. The reference light is expanded to one or more spatially-separated regions of the exit-pupil expander. The expanded reference light is passed through a liquid-crystal variable retarder. Based on detecting the expanded reference light that passes through the liquid-crystal variable retarder, a spatially-dependent retardance of the liquid-crystal variable retarder is determined.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
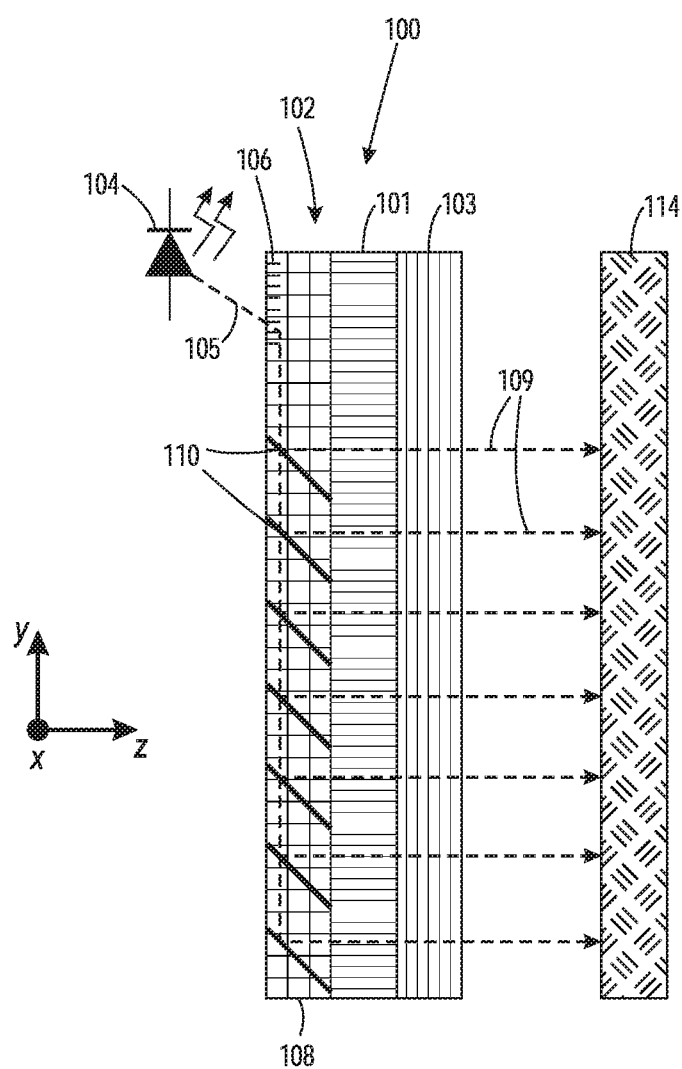
FIG. 1 is a diagram of an optical device according to an example embodiment.

The present disclosure relates to liquid-crystal devices used for optical retardance control. Generally, liquid-crystal (LC) materials are liquids having some crystalline properties (e.g., orientation of internal structures, such as the LC director that indicates the local average alignment of LC molecules) that can be selectably altered by applying an external stimulus, such as an electric field or a magnetic field. A change in orientation of the LC director alters the optical properties of the LC materials, e.g., changing the optical axis of the LC birefringence. While the selectable orientation of liquid crystals has a wide range of applications (e.g., electronic displays) the present disclosure is directed to a class of devices known as variable optical retarders, or LC variable retarders (LCVRs).

An LCVR generates a variable optical path delay, or a variable retardance, between two orthogonal polarizations of light that travel through the liquid crystal. One or more liquid-crystal cells within the LCVR function as electrically tunable birefringent elements. By varying the voltage across the electrodes of the liquid-crystal cell, the cell molecules change their orientation, and it is possible to create a variable optical path delay between first rays in an incident polarization direction and second rays in an orthogonal polarization (e.g., ordinary and extraordinary rays). This path delay causes a wavelength-dependent phase shift between the first and second rays.

Because LCVRs generate an electrically-controllable optical path delay, they are sometimes used within interferometers, specifically polarization interferometers. Polarization interferometers are common-path interferometers (meaning that both arms of the interferometer follow the same geometrical path) that combine polarizing elements with birefringent elements to generate interferograms, whereby the optical path delay induced by the birefringent elements varies spatially and/or temporally.

To create a polarization interferometer with an LCVR, the LCVR is placed between a first polarizer and a second polarizer with nominally parallel or perpendicular polarization axes. The slow axis of the LCVR (the polarization axis with the variable optical path delay) is oriented nominally 45 degrees with respect to the polarization direction of the first polarizer. Incoming light is polarized to an incident polarization direction by the first polarizer. Because the slow axis of the LCVR is at 45 degrees with respect to this incident polarization direction, the polarized incident light can be described in terms of a portion of light polarized parallel to the slow axis of the LCVR and a portion of light polarized perpendicular to this axis.

As the light passes through the LCVR, it acquires a wavelength-dependent relative phase shift between the first and second polarizations, thereby leading to a wavelength-dependent change in the polarization state. The second polarizer, or analyzer, oriented either parallel or perpendicular to the first polarizer, interferes the portion of light polarized parallel to the slow axis of the LCVR with the portion of light polarized perpendicular, changing the wavelength-dependent polarization state at the output of the LCVR into a wavelength-dependent intensity pattern that can be sensed by an optical detector or a focal plane array. By sensing this intensity while varying the retardance of the LCVR, it is possible to measure an interferogram of the incoming light, which can be used to ascertain spectral properties of the incoming light.

A polarization interferometer based on an LCVR may have a number of uses. For example, such a device may be used in hyperspectral imaging applications because of its abilities to encode spectral information of the incident light into an intensity pattern that is easily measured with a non-spectrally-resolving detector. Hyperspectral imaging refers to methods and devices for acquiring hyperspectral datasets or data-cubes, which may include images where densely sampled, finely resolved spectral information is provided at each pixel.

The wavelength-dependent intensity pattern provided by the polarization interferometer corresponds approximately to a cosine transform of the spectrum of the incident light. By recording the spatially-dependent intensity pattern at the output of a polarization interferometer as a function of the LCVR's retardance, the interferograms generated by all points of a scene imaged through the LCVR can be sampled simultaneously. From this, the hyperspectral data-cube can be nominally recovered by applying a transform, such as an inverse cosine transform or Fourier transform along the retardance axis, to the recorded spatially-dependent interferogram.

To accurately calculate the hyperspectral data-cube, the processing apparatus used to apply the above transform should have precise knowledge of the optical path delay of the LCVR over its clear aperture for each individual interferogram sample. This can be done, for example, with a monochromatic reference light source, calibration light source, or laser that is pointed through the LCVR and linearly polarized at 45 degrees with respect to the LCVR's slow axis. The intensity of the light that has passed through the LCVR and is polarized parallel to the source polarization is recorded, and the phase (and thus the optical path delay) is calculated via methods known in the art, such as the Takeda Fourier-transform method. However, for practical reasons, this measurement is typically done only at one location of the LCVR, using the assumption that the retardance of the LCVR has no spatial dependence. However, the LCVR can have significant spatially-dependent retardance variation, so this assumption can lead to potential errors in calculating portions of the hyperspectral data-cube from regions of the spatially-dependent interferogram that are imaged through positions of the LCVR that differ substantially in retardance from where the retardance is actually measured.

The LCVRs typically used for a hyperspectral imager generally comprise thick LC layers in order to access a high level of optical retardance. This required LC layer thickness leads to LCVRs that switch slowly, potentially much more slowly than is desirable in a hyperspectral imaging arrangement. It is possible to switch the LCVR much faster than its natural relaxation time by dynamically driving the LCVR with an appropriate voltage waveform. However, the faster the LCVR is driven, the more likely it is that a spatial dependence is introduced into the instantaneous retardance. This is because the LC cells in the LCVR are generally not perfectly flat or homogeneous, and each position responds differently depending on its thickness or other position-dependent parameters. In order to remedy this, the spatially-dependent retardance can be measured at many points across the LCVR as the nominal retardance is changed in order to improve accuracy of the transform operations used to calculate the hyperspectral data-cube. More details of the hyperspectral imaging process can be found in U.S. Publication 2016/0123811, dated May 5, 2016, as well as A. Hegyi and J. Martini, Opt. Express 23, 28742-28754 (2015).

One technique for combining two images in a compact form factor is referred to as "waveguiding." Generally, light from a display is coupled into a glass "waveguide" that forms the display window using some form of coupling element, e.g., a diffractive optical element. It is then coupled out of the display window using a second coupling element. The coupling element could be, for example, a diffractive element, partially reflective element, waveguide coupler, etc. This arrangement functions as a periscope, and it expands the exit-pupil of the display. It is known in the art as an "exit-pupil expander." The present disclosure relates to a device and a method for combining an exit-pupil expander with a liquid-crystal variable retarder.

In FIG. 1, a block diagram shows an optical device using an LVCR 100 with an exit-pupil expander 102 according to an embodiment. The LCVR 100 includes a liquid-crystal layer 101 adjacent a substrate 103. The LCVR 100 is adjacent to a reference light source 104, such as a laser that provides collimated monochromatic light with a predetermined polarization state. Other light sources may be used, e.g., light-emitting diodes, and used with other optics integrated with the light source 104 or substrate, such as collimators, polarizers, filters, mode shifters, etc. Light from the light source 104 is coupled into the exit-pupil expander 102, which includes a glass substrate 108 that, as shown in this example, may be formed integrally with the LCVR 100. Light 105 (indicated by dashed lines in the figure) from the light source 104 is coupled into the glass substrate 108 via an optical input feature 106, such as an input waveguide, input facet, or diffractive optical element such as a ruled or holographic grating. The glass substrate functions as a waveguide that guides the light to a plurality of second coupling elements 110 that couple light 109 out of the substrate 108 and through the LCVR 100. In contrast to near-eye displays, the angular field-of-view of the expanded exit-pupil should be very small. This is so the angular dependence of the optical path delay through the LCVR 100 is not an issue. A preferred embodiment would ensure that the coupled light 109 would have a nominally linear polarization state with a nominally 45 degree angle between the polarization axis and the slow axis of the LCVR 100.

The plurality of coupling elements 110 are spatially dispersed over a major surface of the glass substrate 108. In the illustrated example, the major surface corresponds to an xy-plane. There may be a detector 114, such as a focal-plane array (FPA) behind the LCVR 100, for example when used for hyperspectral imaging. The coupling of the light 105 to different regions of the LC layer 101 allows measuring instantaneous optical path delay at different xy-coordinates through the LCVR 100. The detector 114 has corresponding sensors (e.g., pixels) at these locations, and a separate measurement of optical path delay can be made at each xy-coordinate, in a preferred embodiment by analyzing the intensity of light polarized parallel to the polarization of the coupled light 109.

The coupling elements 110 cause light emitted from the exit-pupil expander 102 to be dispersed through one or more spatially unique regions of the LCVR 100. The one or more coupling elements 110 may be arranged such that the exit-pupil expander 102 emits light 109 in the z-direction and from a one-dimensional pattern, e.g., from a line parallel to the y-direction. In other embodiments, the exit-pupil expander 102 may emit a two-dimensional pattern. The diagrams of FIGS. 2 and 3 show examples of exit-pupil expanders that emit two-dimensional patterns and may be used in the apparatus of FIG. 1.

Figure 2:
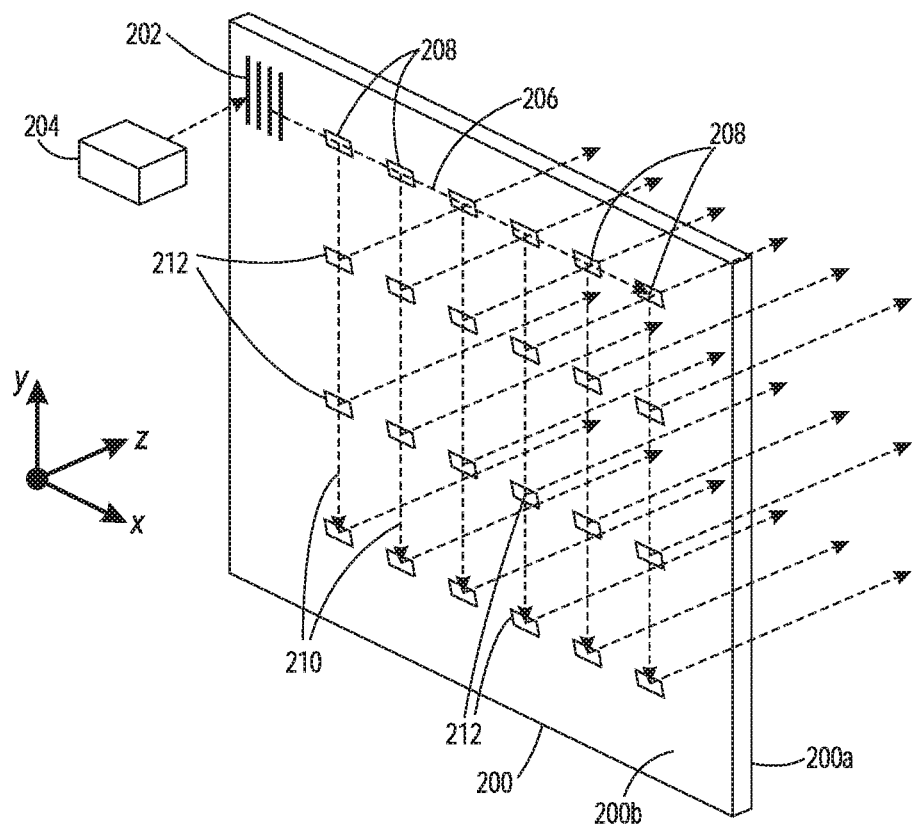
FIGS. 2 and 3 are diagrams of exit-pupil expanders according to example embodiments.

In FIG. 2, an exit-pupil expander includes a transparent substrate 200 with an optical input feature 202 (e.g., a diffractive grating, input waveguide, etc.) on a surface 200b of the substrate 200. The optical input 202 could be on any surface of the substrate 200, including the edges. The optical input 202 is configured to receive light from a light source 204 and direct the light along a first path 206, e.g., a first horizontal waveguide formed in the substrate 200. A plurality of first coupling elements 208 are configured to reflect a part of the light to second paths 210, e.g., second vertical waveguides formed in the substrate 200. It will be understood that the terms "horizontal" and "vertical" are used for convenience in reference to the drawings and not considered limiting; the exit-pupil expander will generally operate the same in any orientation.

A plurality of second coupling elements 212 are arranged along the second light paths 210 and configured to reflect part of light incident on the elements 212 towards an output surface 200a of the substrate 200. The second coupling elements 212 are shown arranged in a rectangular grid, although other patterns are possible. For example, the coupling elements 212 can be non-evenly spatially distributed based on a priori knowledge of the LCVR, e.g., increasing density of the elements 212 in regions that are to experience larger spatial gradients of retardance. Note that each of the coupling elements 208, 212 will be configured to reflect a first portion of light and transmit a second portion of light further along the light path. For example, assuming uniform illumination over the grid is desired and assuming no optical loss, the leftmost optical element 208 would be configured to reflect ⅙ of the incident light in the negative y-direction and transmit ⅚ of the incident light in the x-direction. The next optical element would reflect ⅕ and pass ⅘, with each element reflecting a relatively greater portion until the rightmost element 208 reflects all of the light. These values can be adjusted for optical losses, manufacturing tolerances, a desired non-uniform intensity distribution, etc.

Figure 3:
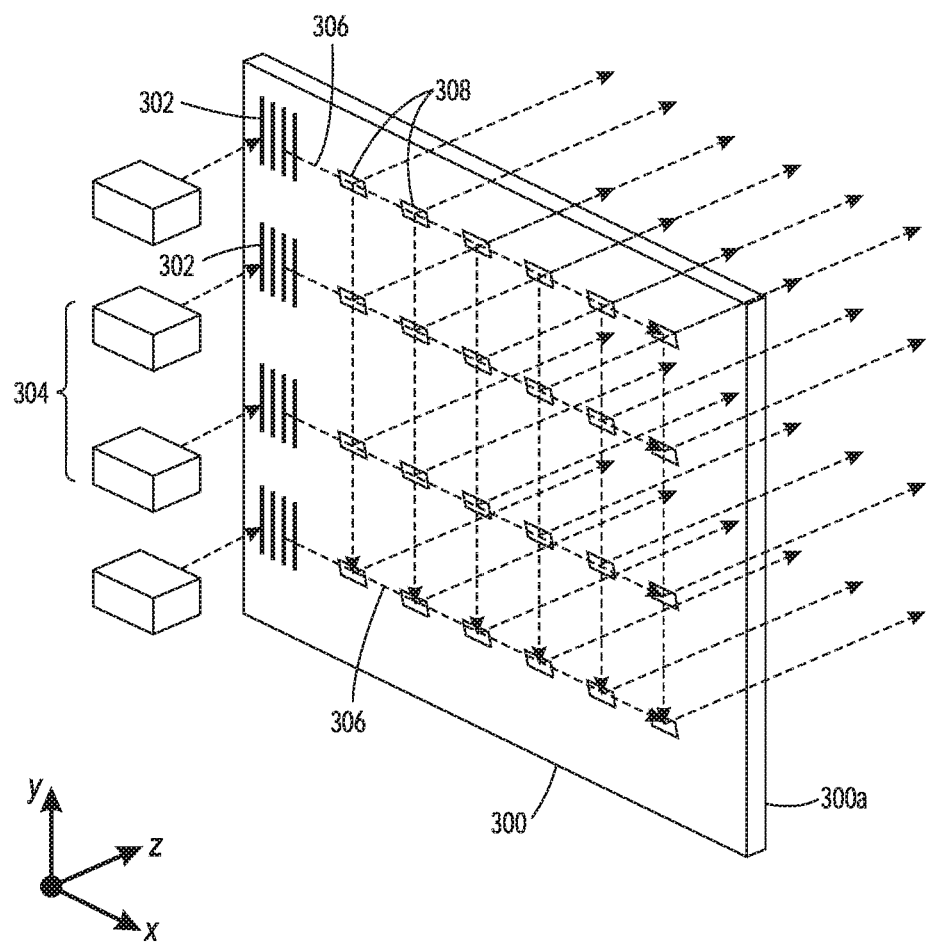

In FIG. 3, an exit-pupil expander includes a transparent substrate 300 with two or more optical inputs 302 (e.g., diffractive gratings, input waveguides, etc.) on one or more surfaces. The optical inputs 302 are configured to receive light from two or more light sources 304 and direct the light along two or more paths 306, e.g., horizontal waveguides formed in the substrate 300. A plurality of coupling elements 308 are configured to reflect a part of the light out of an exit surface 300a of the substrate 300. The coupling elements 308 may be configured similarly to like-named elements described in relation to FIG. 2.

An optical device as shown in FIG. 1 can use an exit-pupil expander using any combinations of features shown in FIGS. 2 and 3. Note that the optical couplers in FIGS. 2 and 3 may use different types of optical elements to result in different patterns being formed at the exit-pupil. For example, coupling elements can form lines, curves, and other shapes instead of the dots shown in FIGS. 2 and 3. It should be mentioned that other methods of exit-pupil expansion can be used. For example, exit-pupil expanders may be formed using microlens arrays or micro-opto-electro-mechanical devices, and holographic optics may be used instead of or in addition to the partially-reflective and/or refractive elements shown above.

Figure 4:
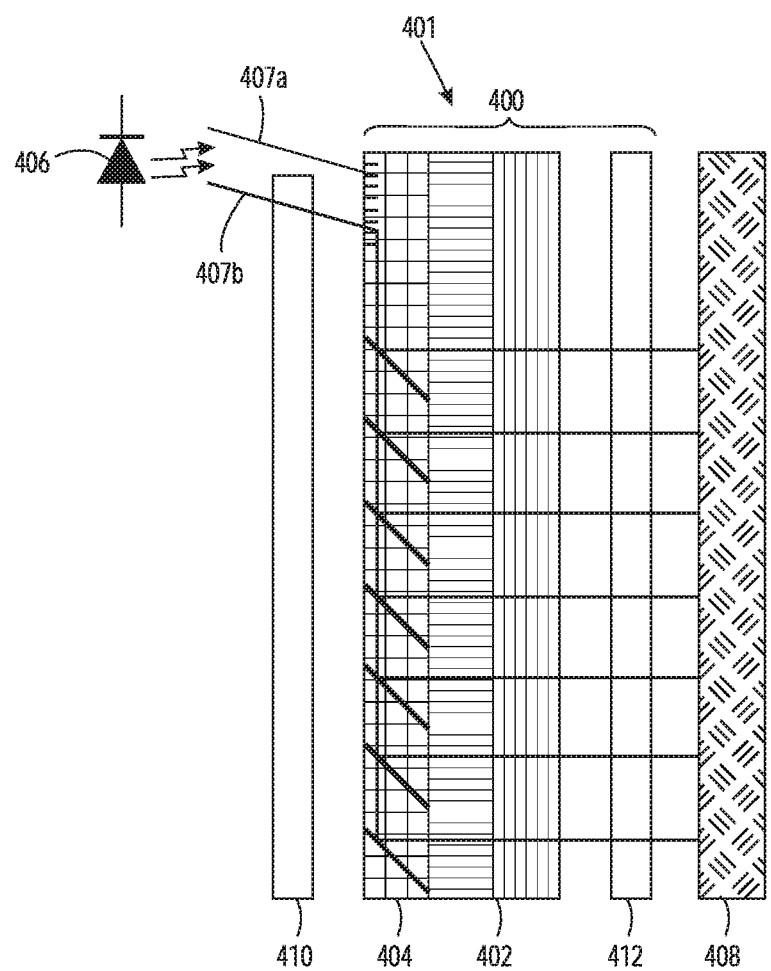
FIG. 4 is a block diagram of a polarization interferometer according to an example embodiment.

In FIG. 4, a diagram shows a polarization interferometer 400 that includes an optical device 401 according to an example embodiment. The optical device 401 includes an LCVR 402 and exit-pupil expander 404 similar to that described in relation to FIG. 1. The exit-pupil expander 404 may be integral with or separate from the LCVR 402. A reference light source 406 (e.g., laser) couples light into the exit-pupil expander 404, which directs it out of the LCVR 402 towards a detector 408. The polarization interferometer 400 also includes polarizers 410, 412 on respective first and second sides of the polarization interferometer. Polarizer 412 is placed between the LCVR 402 and the detector 408, such that light coupled out of the exit-pupil expander 404 also travels through the polarizer 412. Light from the light source 406 may or may not travel through the polarizer 412 before being coupled into the exit-pupil expander 404, as indicated by alternate paths 407a-b.

Figure 5:
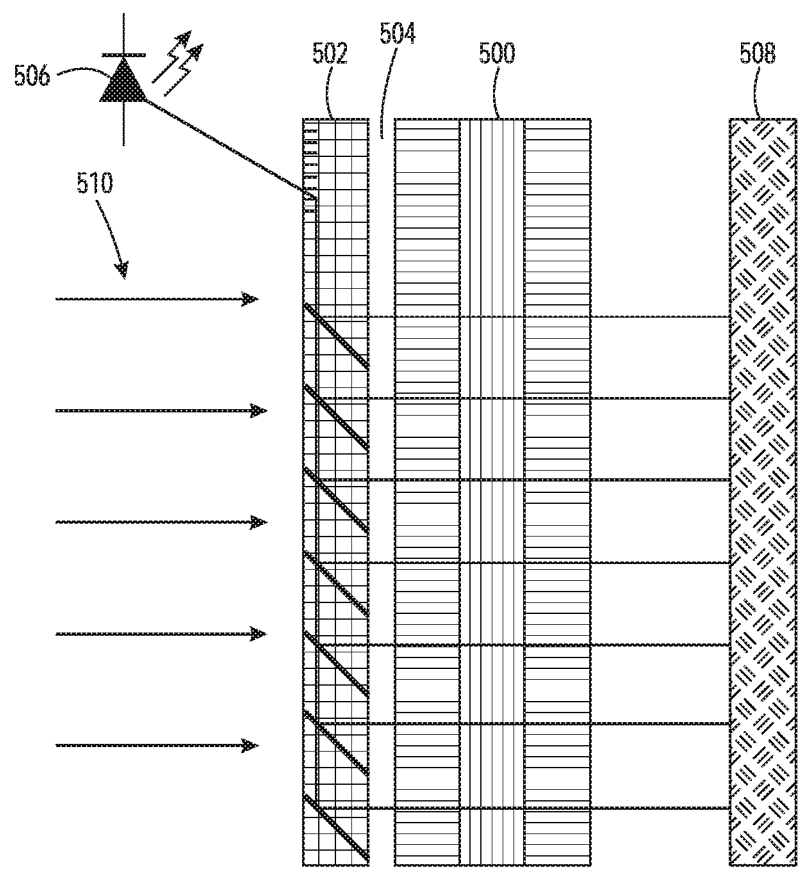
FIGS. 5-7 are diagram of liquid-crystal variable retarders according to other example embodiments.

In FIG. 5, a diagram shows an LCVR 500 used with an exit-pupil expander 502 according to another example embodiment. The LCVR 500 and exit-pupil expander 502 are separated via a gap 504, e.g., an air gap. The gap 504 increases the index of refraction contrast between the waveguides in the exit-pupil expander 502 and the surrounding media. The liquid-crystal material within the LCVR 500 has a similar index of refraction to many of the transparent substrates used in LCVRs, e.g., glass, decreasing the number of guided optical modes within its substrates. Therefore, in many embodiments it may be preferable to include the gap 504 in order to sufficiently maintain the desired guided optical modes within the waveguides of the exit-pupil expander 502. As with previous figures, a reference light source 506 and detector 508 can be used together with the LCVR 500 and exit-pupil expander 502.

Consideration should be made such that an exit-pupil expander does not adversely obscure the external light that is to pass through the LCVR, e.g., from an object to be imaged, as represented by arrows 510 in FIG. 5. This can be done, for example, with the use of a "low efficiency" exit-pupil expander, e.g., using coupling elements that couple the light out of the guided modes of the exit-pupil expander with low efficiency. By optical reciprocity, such low-efficiency couplers would minimally couple the image light 510 into the guided modes of the exit-pupil expander 502 and would therefore allow the image light 510 to be imaged by the detector 508. The intensity of the light source 506 can always be increased to compensate for the low efficiency of the couplers.

Figure 6:
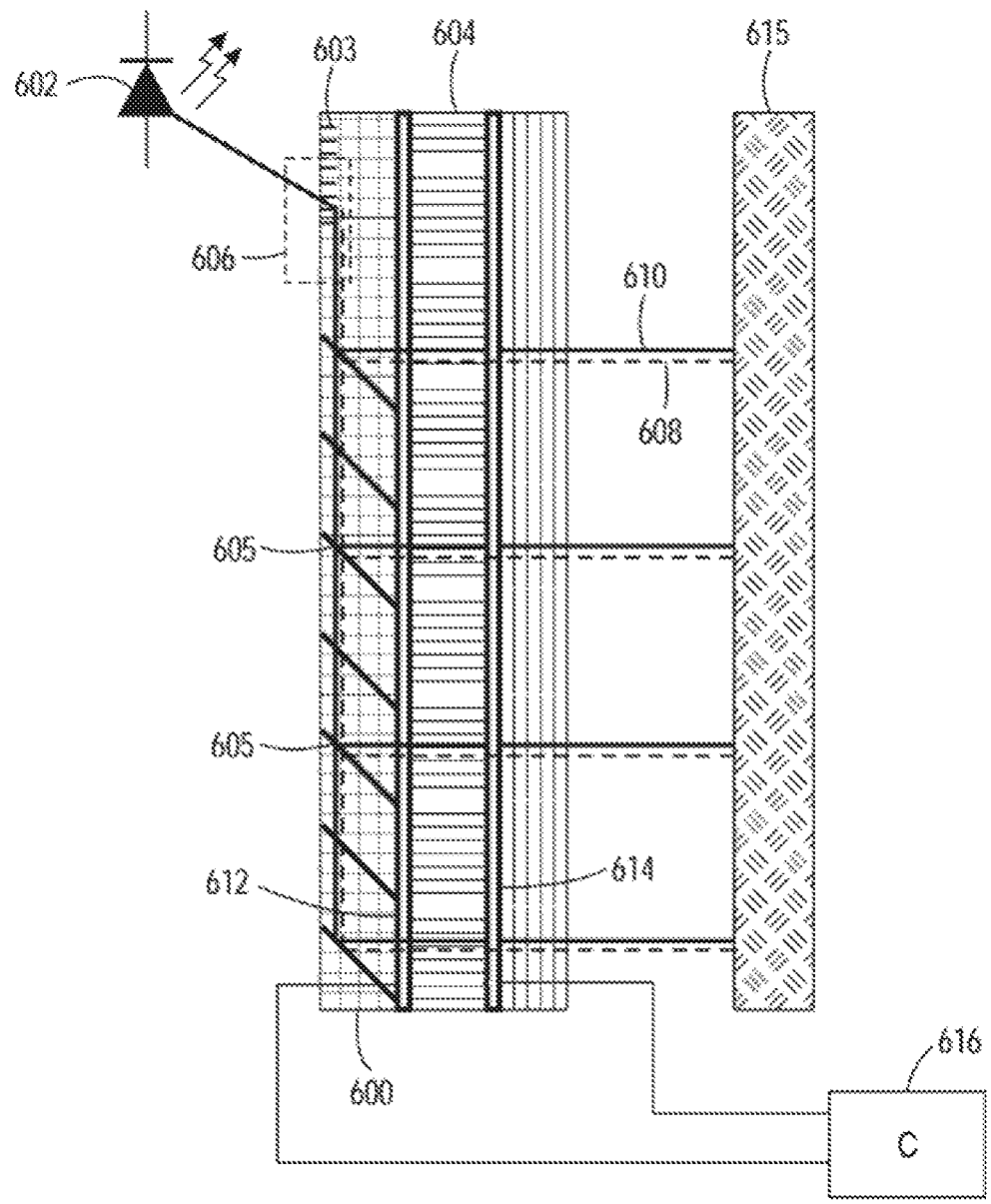

In FIG. 6, a block diagram shows an exit-pupil expander 600 according to another example embodiment. The expander 600 provides an exit-pupil for a reference light source 602 to be expanded into a pattern across an LCVR 604, such as a pattern of dots or lines, that spatially samples the LCVR 604 with enough points to estimate the spatial distribution of retardance but not so many that it adversely obscures the LCVR's clear aperture. Thus, the exit-pupil expander 600 may include fewer and/or smaller optical coupling elements and waveguides than embodiments shown above. For example, the optical coupling elements and waveguides may expand the area of the exit pupil to no more than 1% of a clear aperture of the LCVR 604. Generally, the clear aperture is an unobscured portion of the LCVR 604 through which light can pass, and for purposes of this disclosure, is intended to cover that unobscured portion of the LCVR 604 through which image light is passed.

Note that, even with a coverage as small as 1% of the LCVR's clear aperture, the exit pupil expander 600 can distribute reference light over enough spatially-distributed regions to estimate the spatially-dependent retardance to a high degree of accuracy. For example, consider a 30 mm×20 mm (600 mm$^2$) clear aperture of an LCVR that is divided into 600 squares (30×20 grid) in which retardance is to be separately measured. Further assume for this example that the exit-pupil expander distributes the reference light to a 30×20 grid of square output couplers, each approximately (0.1 mm)$^2$=0.01 mm$^2$ in area. In such a case, the total area of the output couplers would be 600×0.01 mm$^2$, which is (6 mm$^2$)/(600 mm$^2$)=1% of the total area of the clear aperture. Note that for simplicity we do not include in the above calculation the obscuration of the clear aperture by waveguides and coupling elements other than the output couplers, although their effects on the clear aperture can also be included.

In combination with or separate from the above, it may be useful to divide the laser light into two predefined polarization states, e.g., linear and circular polarization states, such that the in-phase and quadrature components of the interferograms used to sample each position of the retardance can be measured. These two measurements can be done using time-multiplexing or space-multiplexing. For example, as shown in FIG. 6, an optional feature 606 within the exit-pupil expander 600 can cause a portion 608 of the light that propagates through the exit-pupil expander 600 to rotate from linearly-polarized light to circularly-polarized, while the rest of the light 610 remains linearly polarized. By comparing the instantaneous intensities from the interferograms of the linearly- and circularly-polarized reference light, or the in-phase and quadrature intensities, it is possible to calculate the instantaneous phase delay, modulo $2\pi$, of the reference light through the LCVR.

The feature 606 may be a waveguide-based polarizing beam splitter followed by a 90° phase shifter of one polarization and a recombination of the two polarizations. The split light beams 608, 610 would couple into adjacent waveguides that travel through the exit-pupil expander 600, and are coupled out of the exit-pupil expander 600 using common or separate coupling elements 605 for each polarization. Each set of adjacent waveguides produces two separate arrays or patterns of dots or lines, the light from one array or pattern being polarization-rotated relative to the other. As seen in the figures, the separate arrays or patterns (or elements thereof) may be located in close proximity so that the in-phase and quadrature interferogram components can be measured as close to each other as possible via detector 615. Note that the arrangement of beam-splitting and polarizing components should be such that the polarization states of split light beams 608, 610 should be as described, e.g., linear and circular polarization, upon exiting the exit-pupil expander.

The feature 606 can be used in any of the embodiments described herein. In other embodiments, two light sources (e.g., two different light sources 304 as shown in FIG. 3) can be configured such that light from the sources is coupled into the exit-pupil expander at different polarizations and distributed through the exit-pupil expander via separate waveguides. Again, this can be used with any of the embodiments described herein by introducing one or more additional light sources and input coupling elements and different waveguides within the exit-pupil expander.

Note that because the measurement of retardance described above relies on detecting the relative phase of two polarizations of light passing from the exit-pupil expander through the LCVR, and because phase can only be directly measured modulo $2\pi$, there is an inherent ambiguity in the measurement of retardance. It some embodiments, the measurement using an exit-pupil expander is combined with one of an alternate modality that gives an absolute (though potentially not as accurate) measure of retardance. One example of such an alternate measurement is shown in FIG. 6, where plates 612, 614 and processing circuitry 616 are used as a capacitance sensor. This sensor can detect capacitance between plates 612, 614 and across the liquid-crystal layer(s) 604 within the LCVR 604, which changes monotonically with retardance as taught in U.S. Pat. No. 5,247,378 dated Sep. 21, 1993. The capacitance may reflect an average retardance, and the spatially-dependent retardance found via the exit-pupil expander can be combined with the average retardance to find an absolute, spatially-dependent, accurate measure of the retardance of the LCVR 604.

Figure 7:
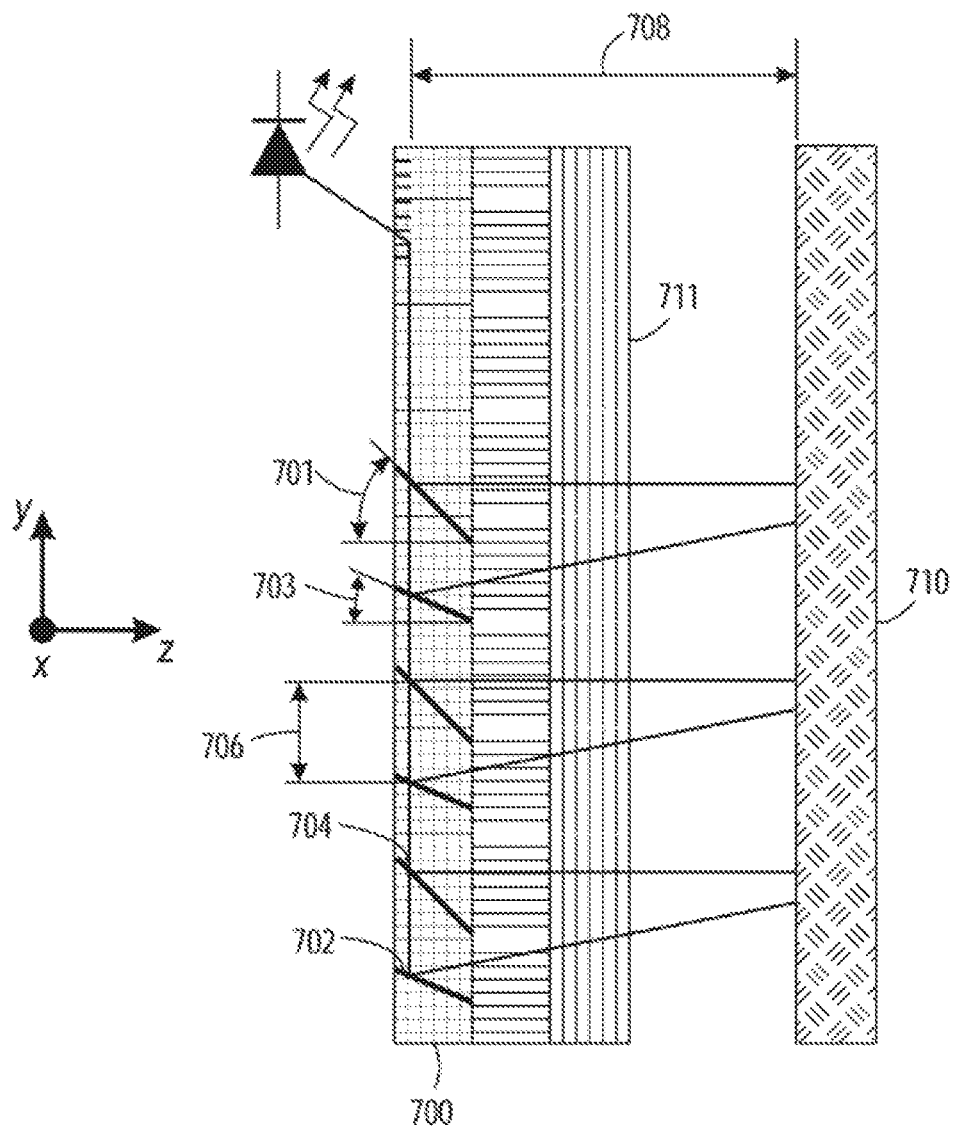

In FIG. 7, a block diagram shows an exit-pupil expander 700 that produces an interference pattern according to an example embodiment. Separate optical coupling elements 702, 704 couple light out of the expander 700 at different output angles 701, 703, e.g., relative to the z-axis in this example. By selecting these angles 701, 703, in combination with their relative spacing 706 between elements 702, 704 in the xy-plane and the distance 708 between the elements 702, 704 and detector 710, interference patterns can be created on select regions of the detector 710. In other embodiments, the distances 706, 708 and angles 701, 703 can be selected such that the rays exiting the LCVR 711 are directed to proximate but non-overlapping regions of the detector 710 such that no interference pattern is created.

Figure 8:
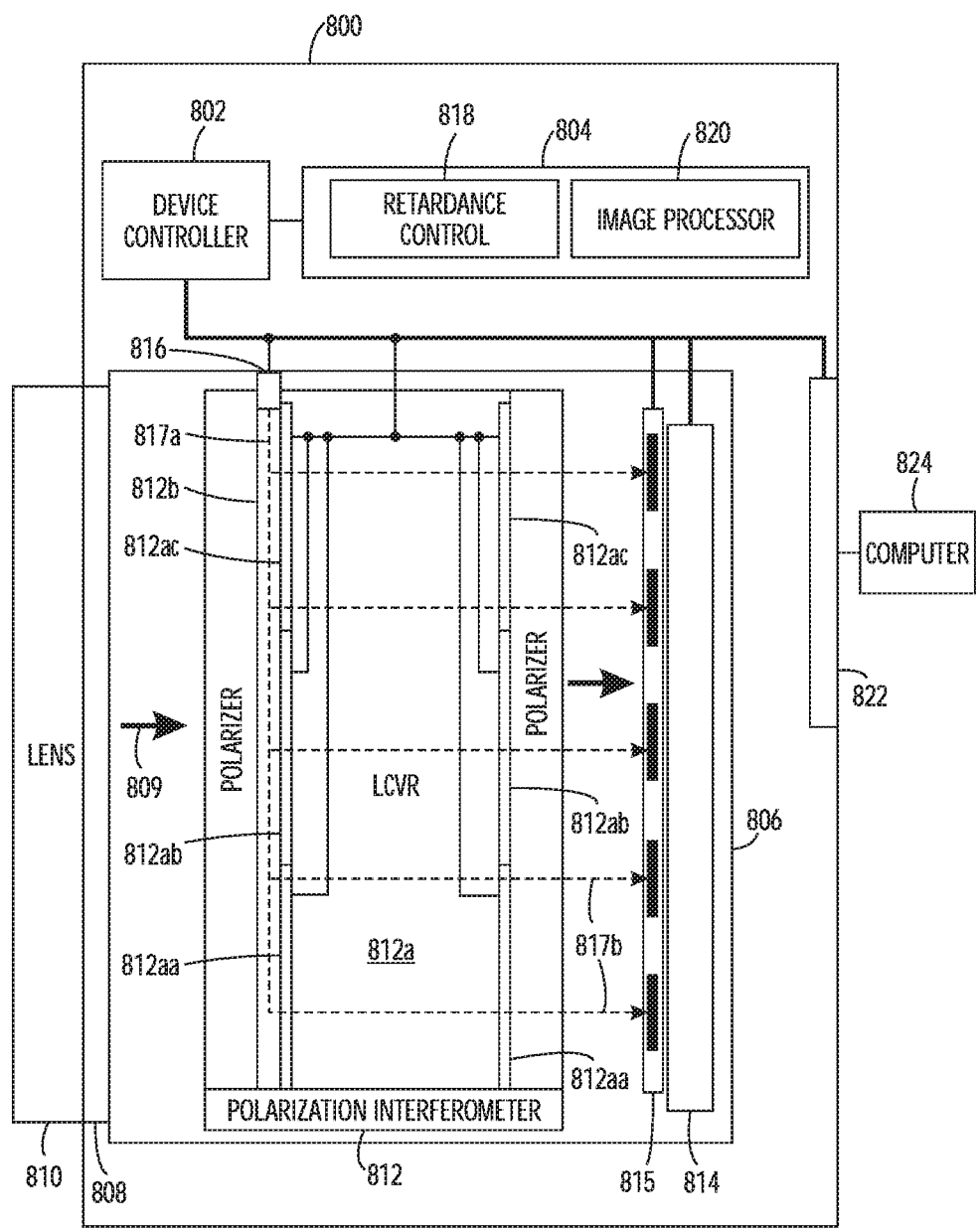
FIG. 8 is a block diagram of an apparatus according to another example embodiment.

In FIG. 8, a block diagram illustrates an apparatus 800 according to an example embodiment. The apparatus 800 includes a device controller 802, which may include one or more processors, such as central processing units, subprocessors, digital signal processors, etc. The controller 802 is coupled to a memory 804 that includes functional modules that will be described in greater detail below. The memory 804 may include a combination of volatile and non-volatile memory, and may store instructions and data as known in the art.

The apparatus includes an optical section 806 that includes an external optical interface 808 that receives light from outside the apparatus 800. The external optical interface 808 may include windows, lenses, filters, apertures, etc., suitable for passing light from outside the apparatus 800 to internal optical components. In this example, the external optical interface 808 is shown coupled to an external lens 810.

A polarization interferometer 812 is located in the optical section 806 of the apparatus 800. The polarization interferometer 812 is coupled to the controller 802, e.g., via electrical signal lines. The controller 802 applies signals to the polarization interferometer 812 to cause a time-varying optical path delay or retardance in an LCVR 812a that is part of the interferometer 812. This time-varying optical path delay creates an interferogram that varies as a function of the optical path delay. The interferogram is detected by an image sensor 814 (e.g., an array of sensor pixels, focal plane array) which is also coupled to the controller 802.

The polarization interferometer 812 includes LCVR 812a that may be configured similar to previously described embodiments. Between the external optical interface 808 and the LCVR 812a is an exit-pupil expander 812b. The exit-pupil expander 812b receives reference light 817a (e.g., polarized and/or collimated monochromatic light) from a light source 816 and expands the light across a major surface of the LCVR 812a. A photodetector (e.g., sensor 814 or optional separate detectors 815) on the other side of the interferometer 812 detects this expanded light 817b and produces a spatially-dependent photodetector signal, e.g., a signal that represents separate light intensity measurements each obtained at a plurality of locations on the detector 814, 815. The controller 802 extracts a spatially-dependent retardance measurement from the photodetector signal.

Note that the expanded reference light 817b may be detected together with or separate from other light 809 (e.g., from an image received from the lens 810) that passes through the LCVR 812a. For example, the optical interface 808 may include a shutter that blocks incoming light for sufficient time to make measurements of the expanded light. In other embodiments, the expanded reference light 817b could be time multiplexed with the image light 809. In such a case, the light source 816 is pulsed at a high intensity in conjunction with a very short exposure at the detector 814, 815. The high intensity of the expanded reference light 817b would minimize the influence of the image light 809. For example, if the intensity of the expanded reference light 817b were 100× or 10,000% of the intensity of the image light 809, then the very short exposure described above to measure the expanded reference light 817b could have an exposure time of 0.01× or 1% of the exposure time used to measure the image light 809 in order to produce the same time-integrated intensity. Therefore, the image light 809 would cause at most a 1% error in the measurement of the expanded reference light 817b.

In other embodiments, the intensity of the expanded reference light 817b could be adjusted to be similar to the image light 809 such that both could be simultaneously captured in the same exposure. If the expanded reference light 817b has sufficient intensity, it should cause a measurable spectral peak in the spectral data recovered via the detector 710, the peak corresponding to the known wavelength of the monochromatic light source 816. The difference between the measured peak wavelength and the known wavelength of the light source 816 could be used, for example, to calibrate the wavelength error of a hyperspectral imager as a function of image position.

The spatially-dependent retardance measurement, as a function of time, can be used by an image processor 820 to calculate a hyperspectral data-cube from recorded interferograms. Generally, the retardance controller 818 instructs the device controller 802 to apply a control signal to the LCVR 812a to achieve a time-varying retardance trajectory, generating spatially-dependent interferograms at the image sensor 814, also as a function of time. The image processor 820 can combine the spatially- and temporally-dependent retardance measurements and interferograms to first calculate the interferogram at each position as a function of retardance, and then to calculate the hyperspectral data-cube by Fourier-transforming all interferograms with respect to retardance. Some or all of this image processing may be performed by an external device, such as computer 824 that is coupled to the apparatus 800 via a data transfer interface 822. In such a case, the computer 824 may also receive spatially-dependent retardance measurements obtained via the exit-pupil expander 812b.

If there are errors in the expected-versus-actual retardance of the LCVR 812a, there will be errors in the resulting spectral data or hyperspectral data-cube if the expected rather than actual retardance is used to calculate those data. The retardance controller 818 can use the spatially-dependent retardance measured via the exit-pupil expander 812 and photodetector 814, 815 as an input to feedback or feedforward control models in order to cause the actual retardance to more closely follow the expected or desired retardance as a function of time. The spatially-dependent retardance measurements could be combined (e.g., spatially averaged) so that deviations from a desired target retardance trajectory can be detected and compensation provided, e.g., by adjusting electrical signals applied to the LCVR 812a. These control models could also utilize capacitance measurements of one or more of the LC cells within the LCVR 812a, e.g., as shown in FIG. 6. Alternatively, the LCVR 812a may comprise more than one electrode (e.g., electrode pairs 812aa-812ac) on each substrate such that spatially-dependent control of the retardance is possible by independent control of the voltage signals across each electrode pair. In this case, the spatially-dependent retardance measurements in the vicinity of a single zone of control of the LCVR 812a would be averaged only over that zone and used to compensate the LCVR 812a control signals for only that zone.

The use of the multiple electrode pairs 812aa-812ac can enable more precise retardance control of different regions of the LCVR 812a, which can reduce errors in the spectral data resulting from spatially-dependent retardance variation of the LCVR 812a. If the image light 809 passing through the LCVR 812a is focused by the lens 810 onto the image sensor 814 and the lens 810 has a large aperture-stop, then the rays of image light corresponding to one image sensor position will pass through different portions of the LCVR 812a and may therefore experience different retardances. This would reduce interferogram contrast and degrade the measurement of the spectral data in such a way that knowledge of the spatially-dependent retardance of the LCVR 812a would not be useful to compensate the degradation. In this case, the spatially-dependent retardance control enabled by the multiple electrode pairs 812aa-812ac could be used to increase the spatial homogeneity of the instantaneous retardance of the LCVR 812a in order to maintain high interferogram contrast and prevent this kind of measurement degradation.

Figure 9:
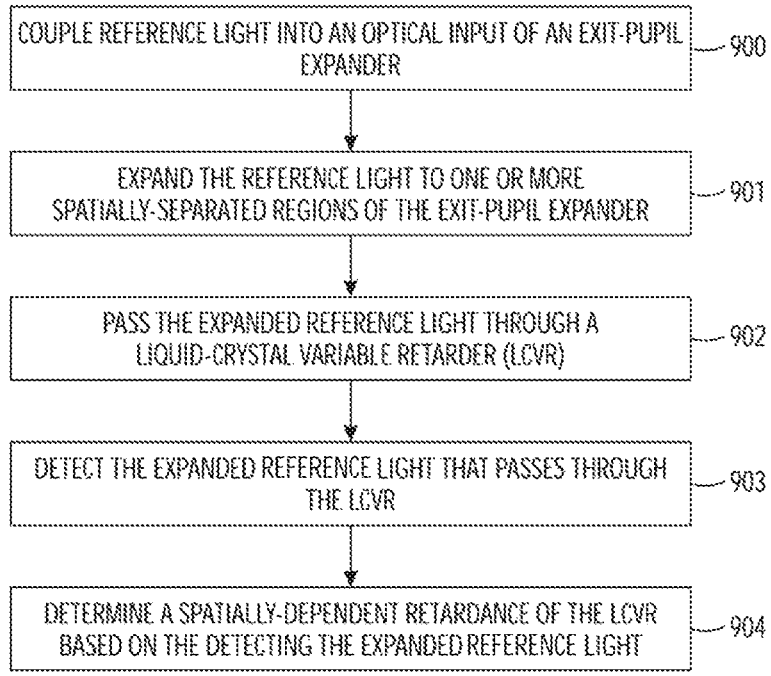
FIGS. 9 and 10 are flowcharts of methods according to example embodiments.

In FIG. 9, a flowchart shows a method according to an example embodiment. The method involves coupling 900 reference light into an optical input of an exit-pupil expander. The reference light is expanded 901 to one or more spatially-separated regions of the exit-pupil expander. The expanded reference light is passed 902 through an LCVR. Based on detecting 903 the expanded reference light that passes through the LCVR, a spatially-dependent retardance of the LCVR is determined 904.

Figure 10:
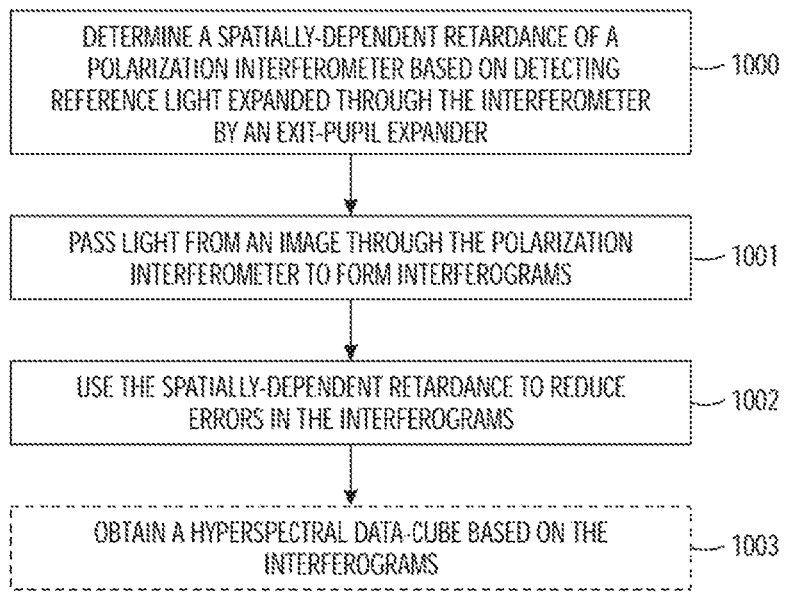

In FIG. 10, a flowchart shows a method according to another example embodiment. The method involves determining 1000 a spatially-dependent retardance of a polarization interferometer based on detecting reference light (e.g., monochromatic, coherent light) expanded through the interferometer by an exit-pupil expander. Light from an image is passed 1001 through the polarization interferometer to form interferograms. The spatially-dependent retardance of the LCVR is used 1002 to reduce errors in the interferograms, e.g., due to spatial variations of optical retardance of the LCVR. A hyperspectral data-cube may optionally be obtained 1003 based on the corrected interferograms.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An optical device comprising:
   a liquid-crystal variable retarder (LCVR);
   an exit-pupil expander optically coupled to the LCVR; and
   two or more electrode pairs covering different spatial zones of the LCVR, the exit-pupil expander comprising:
      at least one optical input feature that receives reference light from a reference light source; and
      one or more optical coupling elements coupled to receive the reference light from the reference light source and expand the reference light to one or more spatially-separated regions of the LCVR, wherein spatially-dependent retardance measurements made via the expanded reference light are used to form separate retardance control signals that are applied to each of the two or more electrode pairs.

2. The device of claim 1, wherein at least one of the input feature and the optical coupling elements comprise a diffractive optical element.

3. The device of claim 1, wherein the one or more optical coupling elements expand the reference light in a two-dimensional pattern.

4. The optical device of claim 1, comprising a gap between the LCVR and the exit-pupil expander.

5. The optical device of claim 1, wherein the exit-pupil expander is formed integrally with the LCVR.

6. An optical device comprising:
   a liquid-crystal variable retarder (LCVR);
   an exit-pupil expander optically coupled to the LCVR, the exit-pupil expander comprising:
      at least one optical input feature that receives reference light from a reference light source; and
      one or more optical coupling elements coupled to receive the reference light from the reference light source and expand the reference light to one or more spatially-separated regions of the LCVR, wherein the reference light is expanded across no more than 1% of a clear aperture of the LCVR.

7. The device of claim 6, wherein the LCVR comprises two or more electrode pairs covering different spatial zones of the LCVR, wherein spatially-dependent retardance measurements made via the expanded reference light are used to form separate retardance control signals that are applied to each of the two or more electrode pairs.

8. The device of claim 6, wherein the one or more optical coupling elements expand the reference light in a two-dimensional pattern.

9. The device of claim 6, wherein the exit-pupil expander is formed integrally with the LCVR.

10. An apparatus comprising:
    a light source that provides reference light;
    an optical device comprising:
      a liquid-crystal variable retarder (LCVR) comprising two or more electrode pairs covering different spatial zones of the LCVR;
      an exit-pupil expander optically coupled to the LCVR, the exit-pupil expander comprising:
        at least one optical input feature that receives the reference light from the light source; and
        one or more optical coupling elements coupled to receive the reference light from the light source and expand the reference light to one or more spatially-separated regions of the LCVR;
    a focal plane array arranged to detect, the expanded reference light that passes through the LCVR and to generate electrical signals in response thereto; and
    a controller coupled to the focal plane array, the controller configured to:
      determine a spatially-dependent retardance of the LCVR based on the electrical signals; and
      apply separate retardance control signals to each of the two or more electrode pairs, the separate control signals based on the spatially-dependent retardance measurements.

11. The apparatus of claim 10, further comprising first and second polarizers on respective first and second sides of the optical device, the controller configured to apply a variable voltage across the LCVR to create a time-varying retardance affecting an image passing through the LCVR, the image passing through the polarizers and the LCVR forming interferograms detected via the focal plane array.

12. The apparatus of claim 11, wherein the controller is further configured to correct the interferograms for spatial variations of optical retardance of the LCVR using the spatially-dependent retardance.

13. The apparatus of claim 11, wherein the expanded reference light combines with the image before detection via the focal plane array.

14. The apparatus of claim 10, wherein the reference light comprises monochromatic, substantially collimated light.

15. The apparatus of claim 10, further comprising a capacitance sensor that provides a signal indicative of an average retardance of the LCVR, the spatially-dependent retardance combined with the average retardance to obtain an absolute, spatially-dependent retardance of the LCVR.

16. The apparatus of claim 10, wherein the exit-pupil expander is formed integrally with the LCVR.

17. The apparatus of claim 10, wherein the reference light is expanded across no more than 1% of a clear aperture of the LCVR.

18. The apparatus of claim 10, wherein the it paths comprise waveguides.

19. The apparatus of claim 10, wherein the exit-pupil expander comprises a planar transparent substrate having at least one optical input feature and a plurality of light paths within the planar substrate that distribute the reference light within the substrate in an in-plane direction, wherein the one or more optical coupling elements reflect the reference light to the LVCR.

* * * * *